United States Patent
Pickelsimer et al.

(10) Patent No.: US 8,385,722 B2
(45) Date of Patent: Feb. 26, 2013

(54) MODULAR DIGITAL VIDEO RECORDER STORAGE

(75) Inventors: Lisa A. Pickelsimer, Atlanta, GA (US); Yousef Wasef Nijim, Roswell, GA (US); Craig Smithpeters, Roswell, GA (US); Hui Zhao, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 198 days.

(21) Appl. No.: 12/870,376

(22) Filed: Aug. 27, 2010

(65) Prior Publication Data

US 2011/0052157 A1    Mar. 3, 2011

Related U.S. Application Data

(60) Provisional application No. 61/238,393, filed on Aug. 31, 2009.

(51) Int. Cl.
*H04N 5/76* (2006.01)
(52) U.S. Cl. ........................ 386/295; 386/294
(58) Field of Classification Search ............... 386/295, 386/291, 292, 294, 336
See application file for complete search history.

(56) References Cited

U.S. PATENT DOCUMENTS 7,395,395 B2 *   7/2008   Roden et al. ............ 711/165
2005/0246485 A1 *  11/2005  Assaf et al. ............. 711/112

* cited by examiner

*Primary Examiner* — Robert Chevalier
(74) *Attorney, Agent, or Firm* — Merchant & Gould

(57) ABSTRACT

Modular storage functionality is provided for a digital video recorder (DVR), which may be configured in such a way as to limit a user's access to the whole storage capacity, and wherein a user may choose to increase or decrease the amount of accessible storage capacity of the internal storage medium.

19 Claims, 3 Drawing Sheets

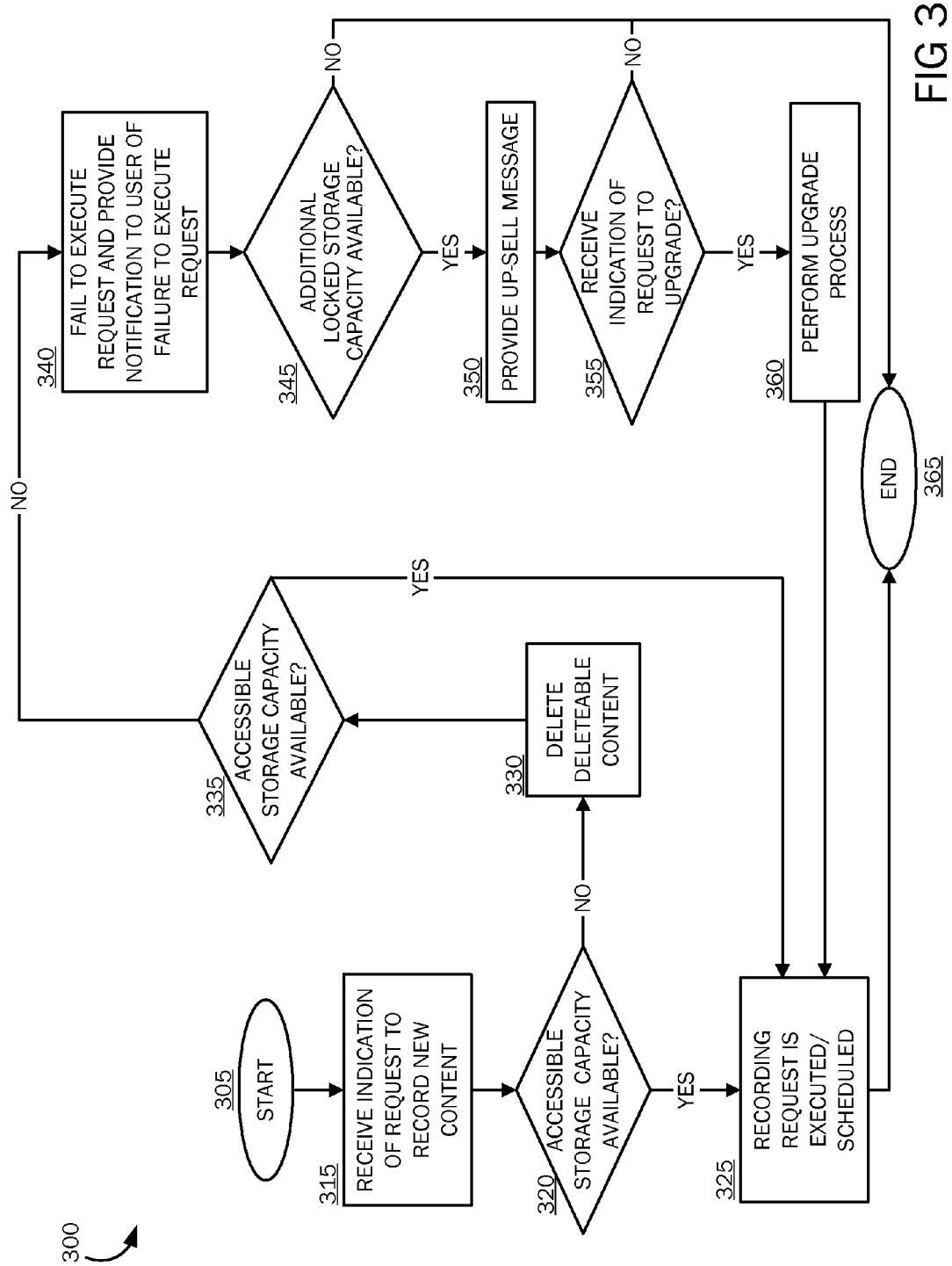

MODULAR DIGITAL VIDEO RECORDER STORAGE

CROSS REFERENCE TO RELATED APPLICATIONS

The present application claims priority to U.S. Provisional Application No. 61/238,393 filed Aug. 31, 2009 entitled "Modular DVR," which is hereby incorporated by reference.

BACKGROUND

A video recorder computing device, such as a digital video recorder (DVR) or personal video recorder (PVR), is a device that may be utilized to digitally record and save media signals in a digital format to a storage medium. When connected to a cable or satellite line, a user may utilize a video recorder computing device to record movies and/or television programs in real-time. Many service providers provide service subscribers with a set-top box having integrated digital video recording capabilities. A video recorder computing device may be a standalone unit, or may be an integrated receiver that functions as a digital cable or satellite receiver and a video recorder computing device. Digital video recording may also be network-based, wherein programming may be recorded and stored in a service provider network and accessed by a user via a network-connected device. Some recorder computing devices may be controlled remotely using an application run on a remote communication device. The term "DVR" as it is used in this specification includes integrated video recorder computing set-top boxes, stand-alone video recorder computing units, network digital video recorders, a recorder associated with a network-connected video receiving device, remote-storage digital video recorders, and the like. Many DVRs utilize a hard disk recorder (HDR) to record to a hard disk drive. Various DVRs have a variety of hard disk drive storage capacities. For example, recording at a basic quality level, a DVR with a forty (40) gigabyte hard disk drive capacity may be able to record approximately forty (40) hours of programming. The more programming a user wants to record, the more storage capacity he/she needs. Video files can be very large, and high-definition videos may be even larger, which requires more hard disk drive space. Oftentimes, DVR users manage to fill their device's hard disk drive to capacity. When a DVR's hard disk drive has been filled to capacity, many DVRs allow for overwriting of old programs in order to make room for new recordings, which means that either DVR users eventually lose the shows they have recorded, or they may have to stop recording new shows.

As technology advances, hard disk drives with more storage capacity than hard disk drives in DVRs produced just a few years ago may become readily available and offered at competitive prices. Oftentimes, service providers lease DVR equipment to customers, and customers may pay for a monthly DVR service. While being able to offer the latest DVR equipment with greater storage capacity to customers may have many benefits, it can also present various customer service issues. For example, customer A and customer B may both subscribe to cable television services and also pay an additional amount for DVR services. Customer A may have acquired his/her DVR unit two years previous to customer B. While customer A and B both pay the same amount for their services, customer A's DVR unit may have half the hard disk drive storage capacity as customer B's. Customer A may have to sacrifice recording certain programming, or may have to delete programming that he/she would prefer to keep because of limited hard disk drive capacity. Customer A may become a dissatisfied customer if he/she becomes aware that he/she is paying the same amount as customer B for DVR service, but customer B has upgraded equipment with more storage capacity. As higher capacity hard disk drives are deployed in the future, more discrepancies in DVR equipment may arise.

It is with respect to these and other considerations that the present invention has been made.

SUMMARY

Embodiments of the present invention are directed to providing modular storage functionality for a digital video recorder (DVR). A modular storage medium may be configured to allow for specified amounts of storage space to be accessible to a user for recording content. Modular storage may include various types of storage media including, but not limited to, a hard disk drive (HDD), a CD ROM, a DVD ROM, flash memory, and a USB data card. As technology advances, more storage capacities may be offered in newer DVR units and services. Since many service providers lease DVR equipment to customers who subscribe to DVR service, newer customers may be provided with superior DVR equipment with larger storage capacities, but may be paying the same amount for DVR services as other customers with older DVR equipment with less storage capacities. In an effort to provide fairer service to customers, embodiments of the present invention provide for storage associated with a DVR to be partitioned to allow for various accessible storage capacities. By provisioning a specified amount of storage per a specified monetary amount integrated into a customer's DVR service fee, cable and satellite service providers may have the ability to provide fairer DVR service in which a customer pays for the level of storage capacity desired.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

FIG. 3 is a flow chart of a method for managing a request to record new content.

DETAILED DESCRIPTION

Figure 1:
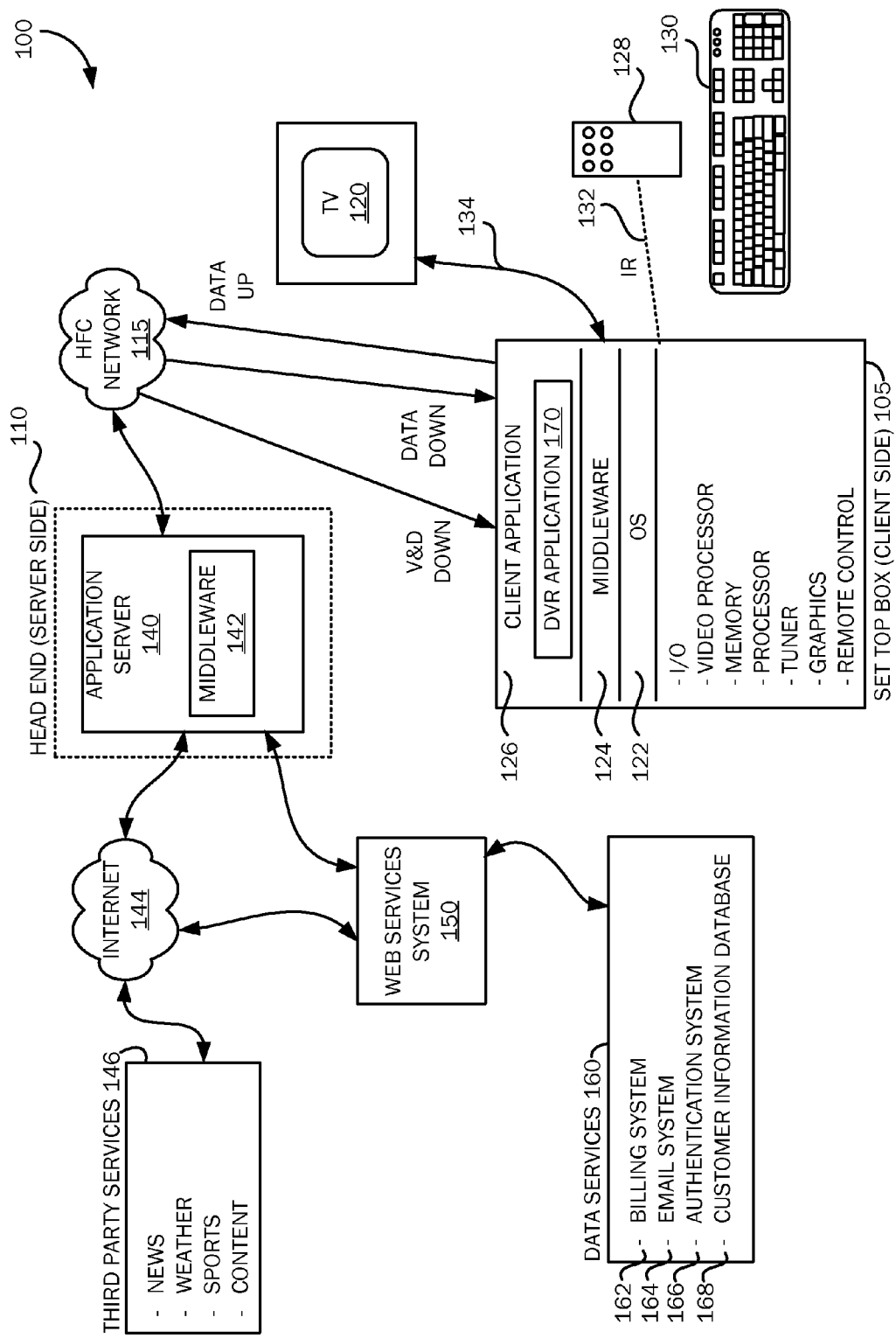
FIG. 1 is a simplified block diagram of a content delivery system in which embodiments of the present invention may be implemented.

As briefly described above, embodiments of the present invention are directed to providing modular storage functionality for a digital video recorder (DVR), which may be configured in such a way as to limit a user's access to the whole storage capacity, and wherein a user may choose to increase or decrease an amount of accessible storage capacity associated with a DVR.

Service providers may provide DVR service to customers, and oftentimes lease DVR equipment to their customers. According to embodiments, a DVR may comprise a HDD or other storage medium with which content may be recorded and stored. According to an embodiment, DVR functionality may be network-based, wherein programming may be recorded and stored in a service provider network and accessed via a network-connected device, such as a set-top box. A user may select content saved on a storage device to playback when the user finds it convenient to do so. As should be appreciated, various DVRs may have various storage capacities. Depending on the storage capacity, the amount of content a user can record and save varies. For example, a DVR comprising a forty (40) gigabyte HDD may be able to save up to forty (40) hours of basic quality content. When recording in high definition, a DVR's storage device can fill up quickly. When a user's storage device is full, he/she may have to delete data to record more programs, or cancel future recordings to keep saved data. As should be appreciated, a DVR with a larger storage capacity is typically preferred.

As technology advances and increases in disk space and data access speeds are made available, newer DVRs may have much more storage capacity than DVRs manufactured even just a year ago. While being able to offer DVRs with higher storage capacities to customers can be a benefit for service providers, a need may arise to make it more fair to DVR customers so that one customer is not paying the same amount for DVR service as another customer who may have a DVR capable of more data storage, and thus receiving a superior service. Embodiments of the present invention provide for a storage device of a DVR to be partitioned to allow for various storage capacities. When a DVR is provisioned to a customer, a default configuration may be set so that a storage device of a DVR may be partially locked, and a specified amount of storage capacity may be available to the customer. If a customer wishes to have additional accessible storage capacity, he/she may upgrade his/her service to allow for additional accessible storage capacity.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

The following describes a simplified block diagram illustrating a cable television/services system (hereafter referred to as "CATV") architecture that serves as one exemplary operating environment for the present invention. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side (backend) head end 110 and a client-side customer via a client-side set-top box (STB) functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. A STB may be integrated with a display device, such as a television, or may be a separate unit. A digital video recorder (DVR) may be integrated into a STB 105 or may be a discrete unit. The term "DVR" as it is used in this specification includes integrated video recorder computing set-top boxes, stand-alone video recorder computing units, network digital video recorders, a recorder associated with a network-connected video receiving device, remote-storage digital video recorders, and the like. A DVR may be described as an electronic device having a storage medium capable of storing media signals in a digital format. The storage medium is commonly a non-volatile storage device such as a hard disk drive, but may include other types of storage media including, but not limited to, CD-RW, CD-W, USB drives, memory sticks or cards, etc. The size/capacity of the storage medium is a determining factor of how much data can be recorded. A STB 105 may comprise a DVR application 170 which may enable DVR functionality to capture, record, and play back content from a storage medium. Alternatively, DVR services may be network-based, wherein programming may be recorded and stored in a service provider network. A STB 105 may be utilized to access recorded and stored content. The input/output mechanism of a STB 105 receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 126. For example, if a client application 126 requires a news flash from a third-party news source to be displayed on the television 120, the operating system 122 may cause the graphics functionality and video processor of the STB 105, for example, to output the news flash to the television 120 at the direction of the client application 126 responsible for displaying news items. Client application 126 may include a DVR application 170.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 126 and operating systems 122 that allow the client applications to communicate with the operating systems through common data calls understood via the API set. As described below, a corresponding middleware layer is included on the server side of the CATV system 100 for facilitating communication between the server-side application server 140 and the client-side STB 105. According to one embodiment of the present invention, the middleware layer 142 of the server-side application server 140 and the middleware layer 124 of the client-side STB 105 format data passed between the client side and server side according to the Extensible Markup Language (XML). As should be appreciated by those skilled in the art, although some embodiments described in this specification are oriented to middleware installed and executed on a STB 105, alternative embodiments implemented as firmware or as hardware are well within the scope of the present invention.

According to one embodiment, the set-top box 105 passes digital and analog video and data signaling to the television 120 via a one-way communication transport 134. According to other embodiments, two-way communication transports may be utilized, for example, via high definition multimedia (HDMI) ports. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB and for distribution to the television set 120. As is understood by those skilled in the art, the "in band" signaling space may operate across a variety of frequency ranges, for example, at a frequency between 54 and 1000 megahertz. The signaling space is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 144 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105. According to one embodiment of the present invention, data obtained and managed by the middleware layer 142 of the application server 140 is formatted according to the Extensible Markup Language and is passed to the set-top box 105 through the HFC network 115 where the XML-formatted data may be utilized by a client application 126 in concert with the middleware layer 124, as described above. As should be appreciated by those skilled in the art, a variety of third-party services data, including news data, weather data, sports data and other information content, may be obtained by the application server 140 via distributed computing environments such as the Internet 144 for provision to customers via the HFC network 115 and the set-top box 105.

According to embodiments of the present invention, the application server 140 obtains customer profile data from services provider data services 160 for preparing a customer profile that may be utilized by the set-top box 105 for tailoring certain content provided to the customer and for pre-populating product/services order forms and customer lead generation forms. As illustrated in FIG. 1, the services provider data services 160 include a number of services operated by the services provider of the CATV system 100 which may include data on a given customer. For example, a billing system 162 may include information such as a customer's name, street address, business identification number, Social Security number, credit history, and information regarding services and products subscribed to by the customer. According to embodiments of the present invention, a billing system 162 may include a service code for identifying selectable HHD sizes. An electronic mail system 164 may contain information such as electronic mail addresses, high-speed Internet access subscription information and electronic mail usage data. An authentication system 166 may include information such as secure user names and passwords utilized by customers for access to network services.

The customer information database 168 may include general information about customers such as place of employment, business address, business telephone number and demographic information such as age, gender, educational level, and the like. The customer information database may also include information on products and services subscribed to by a customer from her cable services provider. For example, in accordance with embodiments of the present invention, the customer information database may contain data to allow a determination as to whether a particular product or service is already provisioned at a customer service address or whether a work order is pending for a particular product or service provisioning at the customer service address. The customer information database may also include information that allows for a determination as to whether prerequisites for provisioning a requested product of service are met by a requesting customer. For example, if a customer requests electronic mail services and high speed Internet access is a prerequisite for electronic mail services, the customer information database may be queried to determine whether the required Internet access is provisioned at the requesting customer location or address.

As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols Referring still to FIG. 1, a web services system 150 is illustrated between the application server 140 and the data services 160. According to embodiments of the present invention, the web services system 150 serves as a collection point for data requested from each of the disparate data services systems comprising the data services 160. When the application server 140 requires customer profile data from one or more of the data services 160 for preparation or update of a customer profile, the application server 140 passes a data query to the web services system 150. The web services system formulates a data query to each of the available data services systems for obtaining any available data for a given customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer profile data. The customer profile data obtained by the web services system is assembled and is returned to the application server 140 for ultimate processing via the middleware layer 142, as described above.

Figure 2:
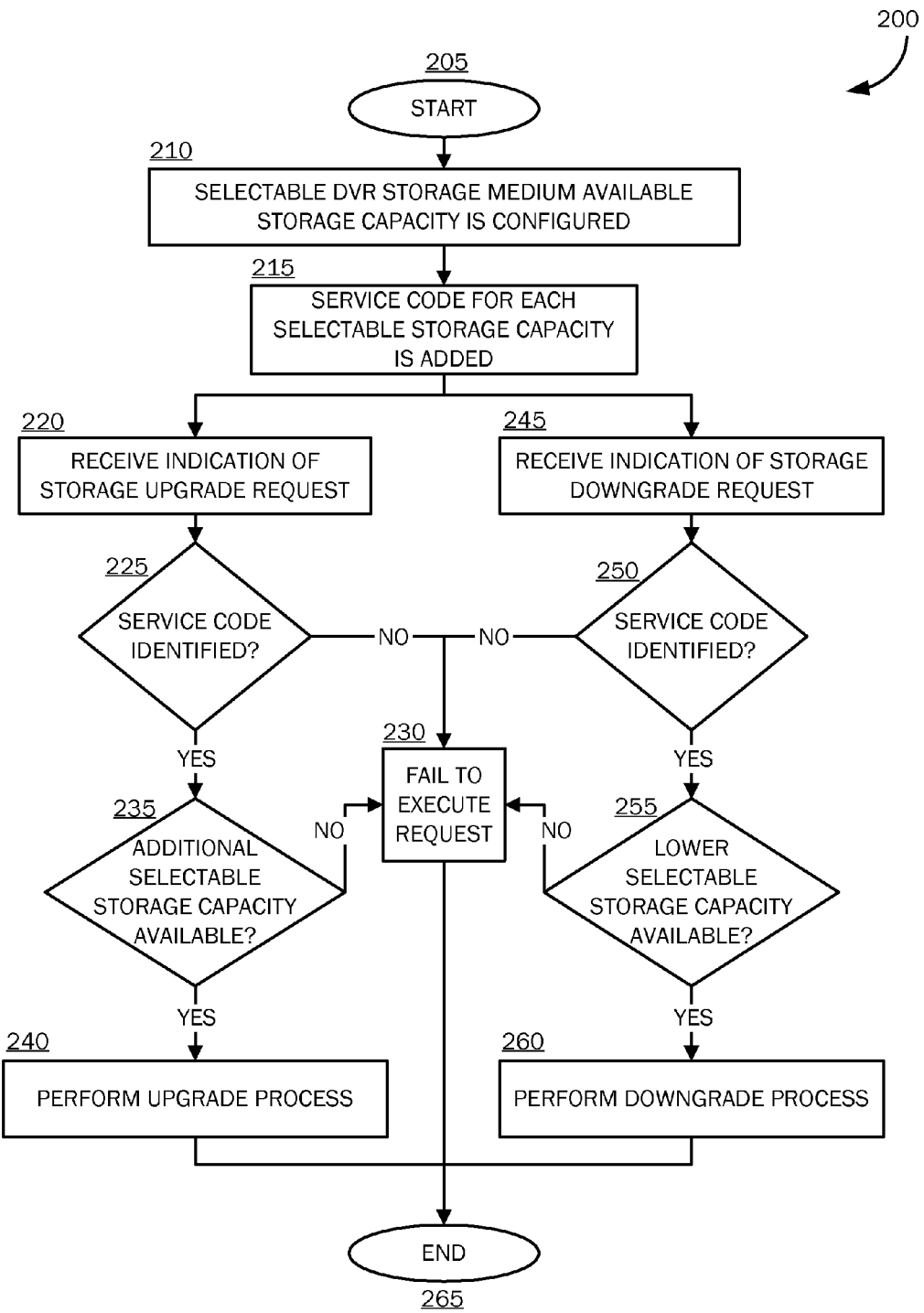
FIG. 2 is a flow chart of a method for providing variable selectable storage capacities of a DVR.

FIG. 2 is a flow chart of a method 200 for providing variable selectable storage capacities associated with a DVR. As described earlier, a STB 105 may have integrated DVR capabilities, or a DVR may be a stand-alone unit, or DVR functionalities may be network-based. A DVR-capable device in which embodiments of the present invention may be incorporated will herein be referred to as a DVR 170. Method 200 may begin at starting OPERATION 205 and proceed to OPERATION 210 where available storage space of a DVR 170 is locked to a configurable size. Before a DVR 170 is provisioned to a customer, full storage capacity may be available and accessible in order to clear and confirm that a previous user's recordings are deleted. When a DVR 170 is sent to a new customer, the full size storage medium may be available until the storage medium is provisioned to a user's account. For example, a DVR 170 may have a 320 GB HDD. A service provider may configure the HDD so that only 160 GB of the 320 GB is accessible for storage of content. As will be described in more detail in this specification, a customer may request to upgrade his/her service to unlock additional accessible storage space. A default configuration may be decided upon by a service provider.

As should be appreciated, a range of configurable storage medium sizes may be provided and supported by a service provider (e.g., 160 GB, 320 GB, 500 GB, 750 GB, etc.). According to an embodiment, various selectable storage medium sizes may be supported by a service provider for applying embodiments of the present invention. In OPERATION 215, a service code for each selectable storage medium size may be added to a service provider's billing system 162 with a corresponding unique billing service code. According to an embodiment, a service code may be utilized to verify that a storage medium is a modular storage medium and its storage capacity may be managed by the service provider. According to another embodiment, a service code may be utilized to verify an storage medium capacity. As will be described in more detail in this specification, according to an embodiment, a service code may be utilized to verify a customer's provisioned storage medium is sufficient to honor a selected storage service upgrade or downgrade request.

The method 200 proceeds to OPERATION 220 where an indication of a storage service upgrade request is received. According to an embodiment, an accessible internal recording space of a modular storage medium may be increased. For example, a customer may have a DVR 170 with a 500 GB HDD configured with 160 GB of accessible storage space. He/she may have content saved that is nearing the accessible capacity if his/her HDD. He/she may want to record a certain program that will exceed the accessible storage capacity, and he/she may not want to delete any of the programming previously saved. Consequently, he/she may desire additional accessible recording space. A customer may request a HDD service upgrade by various ways including, but not limited to, calling a customer service representative, through an order service by an interactive application, via an online communication system, or by other ways known in the art.

The method 200 proceeds to OPERATION 225 where, according to an embodiment, after an indication of a storage upgrade request is received, a billing system 162 may verify a service code corresponding to a selectable storage medium size. In some cases, a service code may not be identified. For example, a customer may own his/her own DVR, or his/her storage medium may not be modular; therefore, a service code may not be provided with a storage medium of a DVR. According to an embodiment, if a service code cannot be identified, a service provider may not upgrade an accessible storage capacity of a DVR 170. At OPERATION 230, a storage service upgrade request may fail to execute.

If a service code is identified by a service provider billing system 162, the method 200 proceeds to OPERATION 235 where a verification of a customer's DVR storage capacity is performed to ensure sufficient additional selectable storage capacity is available to honor the selected storage service upgrade request. According to an embodiment, a physical capacity of an internal storage medium on a given DVR 170 may be communicated through common data calls understood via an API set. According to one embodiment, an API set may be called from a head end 110 to communicate the physical capacity of the storage medium. According to another embodiment, an API set may be called from a client application 126. As should be appreciated, an API set may be located on a middleware layer or a firmware layer of a server and client side. If a customer's storage capacity is not sufficient to honor a selected storage service upgrade request, the method 200 may proceed to OPERATION 230, where a storage service upgrade request may fail to execute. According to an embodiment, if a storage service upgrade request fails to execute, a customer service representative may be prompted to inform the customer that the storage associated with his/her DVR 170 cannot be upgraded. A customer service representative may take action to facilitate a customer DVR 170 swap in order to provide the customer with a DVR with a larger physical storage capacity.

If a customer's storage medium capacity is sufficient to honor a selected storage service upgrade request, the method 200 may proceed to OPERATION 240, where a selected storage service upgrade process is performed. According to an embodiment, a service code may be utilized to unlock additional storage medium space.

According to an embodiment, when a customer upgrades to additional accessible storage capacity, content stored on a DVR 170 is preserved. That is, when a DVR storage medium partition is extended, the storage medium's content is preserved. Content may be stored on an internal storage medium and/or an external storage medium. According to an embodiment, internally and externally stored content may be preserved when an internal DVR storage medium partition is extended.

In some cases, a customer may wish to downgrade storage service and have less storage capacity accessible to him/her. At OPERATION 245 in method 200, an indication of a storage downgrade request may be received. A storage downgrade request may be communicated in various ways, for example, by contacting a customer service representative.

According to an embodiment, after an indication of a storage downgrade request is received, the method 200 proceeds to OPERATION 250 where a billing system 162 may verify a service code corresponding to a selectable storage medium size. In some cases, a service code may not be identified. For example, a customer may own his/her own DVR, or his/her storage medium may not be modular; therefore, a service code may not be provided with a storage medium of a DVR 170. According to an embodiment, if a service code cannot be identified, a service provider may not downgrade a selectable storage capacity of a DVR 170, and the method may proceed to OPERATION 230, where a storage service downgrade request may fail to execute.

If a service code is identified by a service provider billing system 162, the method 200 proceeds to OPERATION 255 where a verification of a customer's DVR storage capacity is performed to ensure a lower selectable storage capacity is available to honor the selected storage service downgrade request. According to an embodiment, and as described above, a physical capacity of an internal storage medium on a given DVR 170 may be communicated through common data calls understood via an API set. According to one embodiment, an API set may be called from a head end 110 to communicate the physical capacity of the storage medium. According to another embodiment, an API set may be called from a client application 126. As should be appreciated, an API set may be located on a middleware layer or a firmware layer of a server and client side. If a lower selectable storage capacity is not available to honor a selected storage service downgrade request, the method 200 may proceed to OPERATION 230, where a storage service downgrade request may fail to execute.

If a lower selectable storage capacity is available to honor a selected storage service downgrade request, the method 200 may proceed to OPERATION 260, where a selected storage service downgrade process is performed. According to an embodiment, a service code may be utilized to lock a specified amount of storage medium space. According to an embodiment, a user may still view his/her previously recorded content after his/her storage recording space has been decreased; however, until enough space to record new content is available, new content may not be recorded. The method 200 ends at OPERATION 265.

According to an embodiment, during an upgrade and/or downgrade process, various functionalities may be unaffected (e.g., Live Off Disk (LOD) functionality, reserved segments of space on an storage medium, E-HDD features, Multi-Room (MR)-DVR functionality, etc).

FIG. 3 is a flow chart of a method 300 for managing a request to record new content. The method 300 may begin at starting OPERATION 305 and proceed to OPERATION 315 where an indication of a request to record new content is received. According to an embodiment, a request to record new content may occur locally (i.e., from DVR 170 or client STB in multi-room DVR network) or remotely (e.g., web, mobile computing device, etc.).

After an indication of a request to record new content is received, the method 300 proceeds to OPERATION 320, where a verification of a customer's accessible DVR storage medium capacity is performed to ensure sufficient accessible storage capacity is available to honor the recording request. According to an embodiment, a physical capacity of an internal storage medium on a given DVR 170 may be communicated through common data calls understood via an API set. According to one embodiment, an API set may be called from a head end 110 to communicate the physical capacity of the storage medium. According to another embodiment, an API set may be called from a client application 126. As should be appreciated, an API set may be located on a middleware layer or a firmware layer of a server and client side.

If enough accessible storage capacity is available to record a desired programming, the method 300 proceeds to OPERATION 325 where the recording request may be scheduled. If there is not enough accessible storage capacity for the recording request, the method 300 proceeds to OPERATION 330 where deleteable content may be deleted. A variety of settings are known in the art that may be selected to manage the deletion of recorded content. For example, a recording may be set to be automatically deleted when space is needed, or a recording may be set to be saved until manually erased. Typically when a program is set for automatic deletion as space is needed, the oldest recordings may be deleted first. According to one embodiment, an amount of deleteable content that would allow enough space to record a requested program may be deleted. According to another embodiment, if a storage capacity has been downgraded and a request to record new content is received, deleteable content exceeding a configured physical capacity of the downgraded accessible storage capacity may be deleted, in addition to an amount of deleteable content that would allow enough space to record a requested program. According to another embodiment, a user may select content to be deleted to free up storage space. According to another embodiment, content that has been viewed and that has not been designated as content to be saved until deleted by a user may be deleted by a DVR application to free up storage space.

The method 300 proceeds to OPERATION 335 where another verification of a customer's accessible DVR storage capacity may be performed. If enough content was deleted in OPERATION 330 to allow for enough room for the requested recording, the method 300 proceeds to OPERATION 325 where the requested recording is scheduled. If there is still not enough accessible capacity for the requested recording, the method 300 proceeds to OPERATION 340 where the recording request fails to execute and a notification of the failure to execute the request may be provided to the requestor (customer).

The method 300 proceeds to OPERATION 345 where a verification of a customer's DVR storage medium capacity may be performed to see if additional selectable storage capacity may be available for a storage service upgrade. If additional selectable storage capacity is available, the method proceeds to OPERATION 350 where an up-sell message is provided to the requestor/customer. After an up-sell message is provided, the method 300 proceeds to OPERATION 355. If an indication of a storage upgrade request is received, the method then proceeds to OPERATION 360 where a storage service upgrade is performed, and additional storage space may be unlocked. According to an embodiment, a service code may be utilized to unlock additional storage space. The method 300 then ends at OPERATION 365.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

As described herein, embodiments of the present invention are directed to providing modular storage functionality for a digital video recorder (DVR), which may be configured in such a way as to limit a user's access to the whole storage medium capacity, and wherein a user may choose to increase or decrease the amount of accessible storage capacity of the storage medium. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for providing modular storage functionality for a digital video recorder, the method comprising:
    configuring a storage medium of the digital video recorder with a plurality of selectable amounts of storage capacity;
    providing a service code for each selectable amount of storage capacity;
    querying a data services system for the service code;
    determining whether additional selectable storage capacity is available for a storage upgrade; and
    if additional selectable storage capacity is available, providing an up-sell message for a selectable additional amount of storage to be unlocked for additional data storage.

2. The method of claim 1, wherein if an indication of a storage upgrade request is received after providing the up-sell message, allowing for a selectable additional amount of storage space to be unlocked for additional data storage.

3. The method of claim 1, wherein if the service code is not identified, disallowing management of additional storage capacity of the storage medium.

4. The method of claim 1, further comprising:
    receiving an indication of a request to record new content;
    determining whether accessible storage capacity is available to record new content;
    if accessible storage capacity is available to record new content, scheduling requested recording;
    if accessible storage capacity is not available to record new content, determining whether any content stored on the storage medium is deleteable;
    deleting an amount of deleteable content stored on the storage medium to allow for enough storage space to record new content;
    determining whether accessible storage capacity is available to record new content after deleteable stored content has been deleted;
    if accessible storage capacity is available to record new content, scheduling requested recording; and
    if accessible storage capacity is not available to record new content, failing to execute the recording request.

5. The method of claim 4 further comprising notifying a requester user of the failure to execute the recording request.

6. A system for providing modular storage functionality for a digital video recorder, the method comprising:
    the digital video recorder having a storage medium configurable with a plurality of selectable amounts of storage capacity; and
    the digital video recorder operative
        to receive an indication of a storage management request;
        to query a data services system for a service code associated with one or more selectable amounts of storage capacity;
        to determine whether a different selectable storage capacity is available for a storage upgrade; and
        to allow for a selectable different amount of storage space to be configured for the storage medium if the different selectable storage capacity is available.

7. A method for providing modular storage functionality for a digital video recorder, the method comprising:
    configuring a storage medium of the digital video recorder with a plurality of selectable amounts of storage capacity;
    providing a service code for each selectable amount of storage capacity;
    receiving an indication of a storage upgrade request;
    querying a data services system for the service code;
    determining whether additional selectable storage capacity is available for a storage upgrade; and
    if additional selectable storage capacity is available, allowing for a selectable additional amount of storage space to be unlocked for additional data storage.

8. A method for providing modular storage functionality for a digital video recorder, the method comprising:
    configuring a storage medium of the digital video recorder with a plurality of selectable amounts of storage capacity;
    providing a service code for each selectable amount of storage capacity;
    receiving an indication of a storage downgrade request;
    querying a data services system for the service code;
    determining whether a lower selectable storage capacity is available for a storage downgrade; and
    if the lower selectable storage capacity is available for the storage downgrade, allowing for a selectable amount of storage space to be locked from additional data storage.

9. The method of claim 8, further comprising allowing a requesting user to view previously recorded content after the storage downgrade.

10. The method of claim 7, further comprising preserving previously recorded content after the storage upgrade.

11. The method of claim 10, further comprising enabling location of previously recorded content on an internal and/or external storage medium.

12. A non-transitory computer readable medium on which is stored computer-executable instructions, which when executed by a computing processor perform a method for providing modular storage functionality for a digital video recorder, the method comprising:
    configuring a storage medium of the digital video recorder with a plurality of selectable amounts of storage capacity; and providing a service code associated with each selectable amount of storage capacity;

receiving an indication of a storage management request;

querying a data services system for the service code associated with each selectable amount of storage capacity;

determining whether a different selectable storage capacity is available for a storage upgrade; and if the different selectable storage capacity is available, allowing for a selectable different amount of storage space to be configured for the storage medium.

13. The non-transitory computer readable medium of claim 12, wherein determining whether the different selectable storage capacity is available for the storage upgrade includes determining whether additional selectable storage capacity is available for the storage upgrade; and if additional selectable storage capacity is available, providing an up-sell message for a selectable additional amount of storage space to be unlocked for additional data storage.

14. The non-transitory computer readable medium of claim 13, wherein if the indication of a hard disk upgrade request is received after providing the up-sell message, allowing for the selectable additional amount of storage space to be unlocked for additional data storage.

15. The non-transitory computer readable medium of claim 12, wherein if the service code is not identified, disallowing management of additional storage capacity of the hard disk.

16. The non-transitory computer readable medium of claim 12, further comprising:

receiving the indication of a request to record new content;

determining whether accessible storage capacity is available to record new content;

if accessible storage capacity is available to record new content, scheduling requested recording;

if accessible storage capacity is not available to record new content, determining whether any content stored on the storage medium is deleteable;

deleting an amount of deleteable content stored on the storage medium to allow for enough storage space to record new content;

determining whether accessible storage capacity is available to record new content after deleteable stored content has been deleted;

if accessible storage capacity is available to record new content, scheduling requested recording; and if accessible storage capacity is not available to record new content, failing to execute the recording request.

17. The non-transitory computer readable medium of claim 16 further comprising notifying a requester user of the failure to execute the recording request.

18. The non-transitory computer readable medium of claim 17, further comprising preserving previously recorded content after the storage upgrade.

19. The non-transitory computer readable medium claim 18, further comprising enabling location of previously recorded content on an internal and/or external storage medium.

* * * * *